US009079129B2

(12) United States Patent
Smith et al.

(10) Patent No.: US 9,079,129 B2
(45) Date of Patent: *Jul. 14, 2015

(54) FILTER CARTRIDGE WITH DIVIDER

(75) Inventors: Paul B. Smith, Ann Arbor, MI (US); Kevin J. Rucinski, Saline, MI (US); Alfred Tondreau, Saline, MI (US); Ken Conti, Hampstead, MI (US)

(73) Assignee: Davco Technology, LLC, Saline, MI (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/897,457

(22) Filed: Oct. 4, 2010

(65) Prior Publication Data

US 2011/0017658 A1  Jan. 27, 2011

Related U.S. Application Data (60) Continuation of application No. 12/267,916, filed on Nov. 10, 2008, now Pat. No. 7,854,837, which is a continuation of application No. 11/581,856, filed on Oct. 17, 2006, now Pat. No. 7,615,146, which is a (Continued)

(51) Int. Cl.
| | |
|---|---|
| *B01D 27/08* | (2006.01) |
| *B01D 36/00* | (2006.01) |
| *B01D 29/11* | (2006.01) |
| *B01D 35/143* | (2006.01) |

(52) U.S. Cl.
CPC ............ *B01D 36/001* (2013.01); *B01D 29/114* (2013.01); *B01D 35/143* (2013.01); *B01D 2201/291* (2013.01); *B01D 2201/295* (2013.01); *B01D 2201/309* (2013.01); *B01D 2201/313* (2013.01); *B01D 2201/34* (2013.01)

(58) Field of Classification Search
None
See application file for complete search history.

(56) References Cited

U.S. PATENT DOCUMENTS

| 34,166 A | 1/1862 | Schaffer et al. |
| 1,830,095 A * | 11/1931 | Dollinger ..................... 55/282.4 |
| 2,145,304 A | 1/1939 | Hill |

(Continued)

FOREIGN PATENT DOCUMENTS

| JP | 60084484 A | 5/1985 |
| JP | 19541962 A1 | 5/1997 |
| JP | 10159530 A | 6/1998 |

OTHER PUBLICATIONS

Plastisonics, ViSUfilter, catalog, no date, all pages, Chicago, Illinois.

(Continued)

*Primary Examiner* — Terry Cecil
(74) *Attorney, Agent, or Firm* — Young Basile Hanlon & MacFarlane P.C.

(57) ABSTRACT

A filter cartridge includes a substantially cylindrical filter media having a first end and a second end wherein the second end has an opening adaptable to receive a fluid outlet. The filter media is adapted to allow fluid to pass from an exterior of the filter media to an interior space of the filter media. A divider is positioned adjacent to the exterior of the filter media, and the divider has a closed end connected to the first end of the filter media and an open end that is longitudinally-spaced from the second end of the filter media such that at least a portion of the filter media located adjacent to the second end of the filter media is not directly adjacent to the divider. The divider extends a majority of the distance from the first end to the second end of the filter media.

20 Claims, 5 Drawing Sheets

Related U.S. Application Data division of application No. 11/027,168, filed on Dec. 30, 2004, now Pat. No. 7,150,824, which is a continuation of application No. 10/301,946, filed on Nov. 22, 2002, now Pat. No. 6,841,065, which is a continuation of application No. 09/800,982, filed on Mar. 7, 2001, now Pat. No. 6,540,909.

(60) Provisional application No. 60/220,540, filed on Jul. 25, 2000.

(56) References Cited

U.S. PATENT DOCUMENTS

| | | | |
|---|---|---|---|
| 2,179,784 A | | 11/1939 | Frudden |
| 2,226,045 A | * | 12/1940 | Baldwin .................... 55/419 |
| 2,635,174 A | | 4/1953 | Kasten |
| 2,638,581 A | | 5/1953 | Marvel |
| 2,669,707 A | | 2/1954 | Mould et al. |
| 2,790,560 A | | 4/1957 | Beyland |
| 2,792,116 A | | 5/1957 | Lenz et al. |
| 2,998,138 A | | 8/1961 | Mould et al. |
| 3,054,391 A | | 9/1962 | Rocklen |
| 3,105,042 A | | 9/1963 | Roosa |
| 3,122,501 A | | 2/1964 | Hultgren |
| 3,224,583 A | | 12/1965 | Rosaen |
| 3,237,770 A | | 3/1966 | Humbert, Jr. |
| 3,239,064 A | | 3/1966 | White |
| 3,297,162 A | | 1/1967 | Mouwen |
| 3,331,509 A | | 7/1967 | Gray, Jr. |
| 3,370,707 A | | 2/1968 | Nordstrom |
| 3,372,808 A | | 3/1968 | Sabo |
| 3,374,892 A | | 3/1968 | Samalon |
| 3,508,657 A | | 4/1970 | Cooper |
| 3,530,382 A | | 9/1970 | Liston et al. |
| 3,630,375 A | | 12/1971 | Hodgkins |
| 3,630,382 A | | 12/1971 | Hodgkins |
| 3,681,562 A | | 8/1972 | Winzen |
| 3,722,691 A | | 3/1973 | Francois |
| 3,749,247 A | | 7/1973 | Rohde |
| 3,815,744 A | | 6/1974 | Vanderpoel |
| 3,841,484 A | | 10/1974 | Domnick |
| 3,931,011 A | | 1/1976 | Richards et al. |
| 3,954,625 A | | 5/1976 | Michalski |
| 3,992,296 A | | 11/1976 | Nobuta |
| 4,017,397 A | | 4/1977 | Copeland |
| 4,021,342 A | | 5/1977 | Schacht et al. |
| 4,075,097 A | | 2/1978 | Paul |
| 4,091,625 A | | 5/1978 | Fontana et al. |
| 4,139,463 A | | 2/1979 | Murphy et al. |
| 4,144,169 A | | 3/1979 | Grueschow |
| 4,153,003 A | | 5/1979 | Willis |
| 4,271,015 A | | 6/1981 | Moore |
| 4,271,016 A | | 6/1981 | Albertson |
| 4,298,465 A | | 11/1981 | Druffel |
| 4,364,825 A | | 12/1982 | Connor, Jr. |
| 4,368,716 A | | 1/1983 | Davis |
| 4,424,128 A | | 1/1984 | Shinaver |
| 4,428,351 A | | 1/1984 | Davis |
| 4,429,665 A | | 2/1984 | Brown |
| 4,522,712 A | | 6/1985 | Fischer et al. |
| 4,540,489 A | | 9/1985 | Barnard |
| 4,544,387 A | | 10/1985 | Agerlid |
| 4,617,116 A | | 10/1986 | Seiler |
| 4,621,593 A | | 11/1986 | Rao et al. |
| 4,751,901 A | | 6/1988 | Moor |
| 4,755,239 A | | 7/1988 | O'Handley |
| 4,759,842 A | | 7/1988 | Frees et al. |
| 4,770,768 A | | 9/1988 | Lang |
| 4,981,584 A | | 1/1991 | Nunes |
| 4,992,166 A | | 2/1991 | Lowsky et al. |
| 4,997,555 A | | 3/1991 | Church et al. |
| 5,059,217 A | | 10/1991 | Arroyo et al. |
| 5,089,132 A | | 2/1992 | Sussich et al. |
| 5,092,303 A | | 3/1992 | Brown |
| 5,098,559 A | | 3/1992 | Mack et al. |
| 5,114,570 A | | 5/1992 | Nelson et al. |
| 5,171,430 A | | 12/1992 | Beach et al. |
| 5,228,990 A | | 7/1993 | Chiang |
| 5,246,571 A | | 9/1993 | Woltmann |
| 5,298,160 A | | 3/1994 | Ayers et al. |
| 5,372,115 A | | 12/1994 | Straub et al. |
| 5,374,355 A | | 12/1994 | Habiger |
| 5,458,767 A | | 10/1995 | Stone |
| 5,484,523 A | | 1/1996 | Bjornsson |
| 5,538,626 A | | 7/1996 | Baumann |
| 5,545,322 A | | 8/1996 | Cheng |
| 5,549,821 A | | 8/1996 | Bounnakhom et al. |
| 5,556,542 A | | 9/1996 | Berman et al. |
| 5,766,449 A | | 6/1998 | Davis |

OTHER PUBLICATIONS

Plastisonics, ViSUfilter: Precision In-Line Fuel Filters, catalog, no date, all pages, Chicago, Illinois.

Plastisonics, Inc., Unique Features of ViSUfilter, product description catalog, no date, all pages, Chicago, Illinois.

* cited by examiner

FILTER CARTRIDGE WITH DIVIDER

CROSS-REFERENCE TO RELATED APPLICATIONS

This patent application is a continuation of U.S. patent application Ser. No. 12/267,916, filed Nov. 10, 2008 now U.S. Pat. No. 7,854,837, which is a continuation of U.S. patent application Ser. No. 11/581,856, filed Oct. 17, 2006, now U.S. Pat. No. 7,615,146, which is a divisional of U.S. patent application Ser. No. 11/027,168, filed Dec. 30, 2004, now U.S. Pat. No. 7,150,824, which is a continuation of U.S. patent application Ser. No. 10/301,946, filed Nov. 22, 2002, now U.S. Pat. No. 6,841,065, which is a continuation of U.S. patent application Ser. No. 09/800,982, filed Mar. 7, 2001, now U.S. Pat. No. 6,540,909, which claims the benefit of U.S. Provisional Patent Application Ser. No. 60/220,540, filed Jul. 25, 2000.

FIELD OF THE INVENTION

The present invention relates to fluid filters, and more particularly, a fluid filter cartridge having a divider to provide an accurate visual indicator as to the remaining life of the filter cartridge.

BACKGROUND OF THE INVENTION

It is well known to utilize fuel filter assemblies to filter fuel for a combustible engine of a motor vehicle. Such fuel filter assemblies comprise a variety of different orientations of the fuel filter assembly. For example, it is known to utilize sideways, downwardly, and upwardly mounted canisters having a paper filter media enclosed in the canister. With respect to upwardly mounted fuel assemblies, prior art filtration devices have been known to draw fuel into the filter assembly by use of a pump on the outlet side of the filter assembly. The fuel is directed downward into a lower chamber of the filter assembly wherein the fuel flow proceeds upward into an upper filter chamber of the filter assembly. The fuel may then be contained and sealed by a transparent filter cover or closure and a filter mount which may separate the lower chamber from the upper chamber.

Within the filter chamber of the filter assembly, the filter assembly may provide a filter canister comprised of a filter media circling a central filter tube that is contained by filter end caps at the top and bottom of the filter media. The end caps are sealed to the edges of the filter media to preclude any possible leak paths at the ends of the filter canister. The filter media typically comprises a porous paper material that may be pleated or concentrically wound so as to direct the fluid through the filter media. The filter media removes and retains undesirable contaminants within and on the media.

As fluid enters the filter chamber, the fuel level rises and passes through from the outside to the inside of the filter media. The fuel then flows downward into a central passage located along the central axis of the canister. The central passageway is in communication with a fuel outlet wherein the fuel passes outwardly from the filter assembly.

During the filtering process, the fuel is either drawn into the filter chamber by a vacuum or pushed into the filter chamber by pressure until the fuel finds a path through the filter media. As the fuel flows through the filter, dirt and other contaminants larger than the porous openings in the filter media are trapped and retained by the filter media. These contaminants plug or clog the porous holes in the filter media and restrict or close the paths used by the flowing fuel. The fuel is then forced to seek other open and less restrictive flow openings which are available above the level of the fuel by climbing the height of the filter and accessing the clean areas of the filter media. This process of clogging and climbing continues until the filter media is completely immersed in the flowing fuel.

Even though the filter media may be completely immersed in the flowing fluid, the incoming fuel continues to pass through the filter media. It is not until the filter media becomes greatly clogged that the filter media needs to be replaced. This is a problem since the user generally views the height of the fuel in the filter chamber to see if the filter media is clogged. If the filter media is completely immersed in fuel, the user generally believes that the filter media needs to be replaced. Therefore, this type of system may lead to premature replacement of the filter media.

It would be desirable to provide a fuel filter assembly that provides an accurate indication as to the remaining usefulness of the filter media.

SUMMARY OF THE INVENTION

The invention provides a filter cartridge that includes a substantially cylindrical filter media having a first end and a second end. The filter media is adapted to allow fluid to pass from an exterior of the filter media to an interior of the filter media, wherein the second end of the filter media has an opening adaptable to receive a fluid outlet. A divider is positioned adjacent the exterior of the filter media, and the divider has a closed end connected to the first end of the filter media and an open end that is longitudinally spaced from the second end of the filter media such that at least a portion of the filter media located adjacent the second end of the filter media is not directly adjacent to the divider. The divider extends a majority of the distance from the first end to the second end of the filter media.

The divider may be substantially parallel to the exterior of the filter media, or the divider may be non-parallel to the exterior of the filter media. The filter media may be substantially cylindrical, and the divider may be substantially cylindrical or frusto-conical.

The filter cartridge may include a top cap that is disposed at the first end of the filter media and a bottom cap disposed at the second end of the filter media wherein the bottom cap has an opening adapted to receive a fluid outlet.

BRIEF DESCRIPTION OF THE DRAWINGS

The description herein makes reference to the accompanying drawings, wherein like-referenced numerals refer to like parts throughout several views and wherein.

DESCRIPTION OF THE PREFERRED EMBODIMENT

Referring to the drawings, the present invention will now be described in detail with reference to the preferred embodiment.

Figure 2:
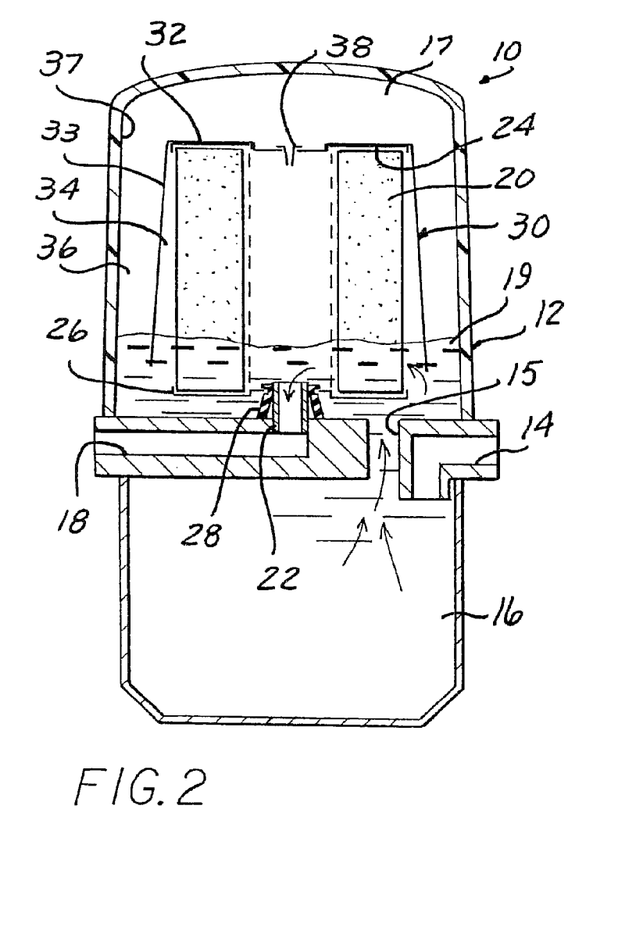
FIG. 2 is a schematic drawing showing the rising fluid level in the fluid filter assembly of the present invention.
Figure 3:
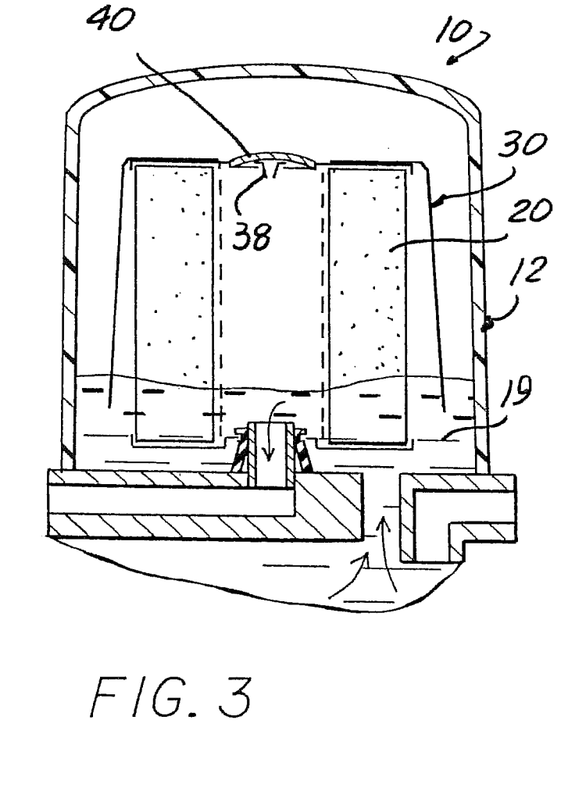
FIG. 3 is a schematic drawing showing a segment of filter media being utilized above a relief valve in the fluid filter assembly of the present invention.
Figure 4:
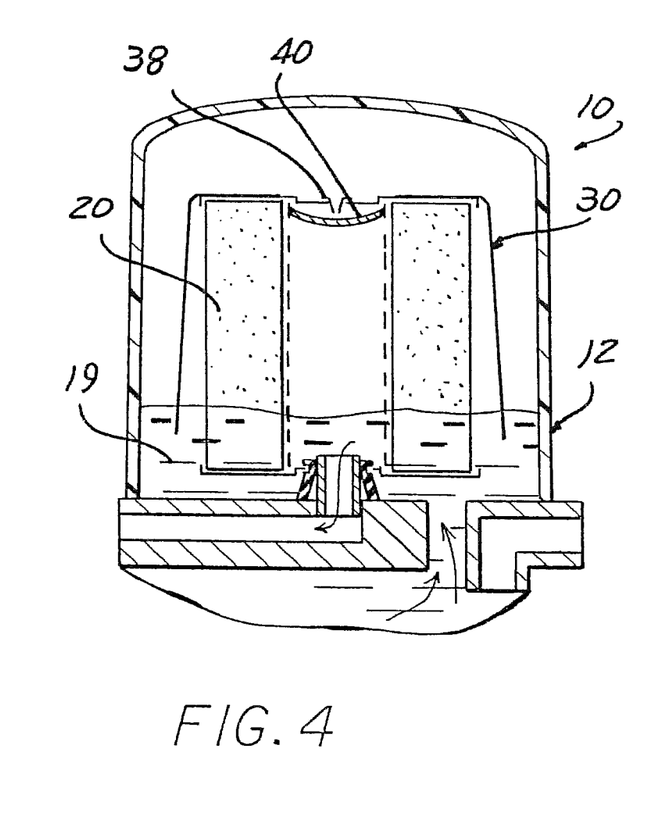
FIG. 4 is a schematic drawing showing a segment of filter media being utilized underneath the relief valve in the fluid filter assembly of the present invention.

FIG. 2 shows a fluid filter assembly 10 of the present invention in its preferred form. The fluid filter assembly 10 is best suited for filtering and processing diesel fuel, but the fluid filter assembly 10 may also be utilized with other fluids, such as gasoline, oil, water, antifreeze, etc. The fluid filter assembly 10 is mounted vertically upright and provides a closed housing 12, a lower fluid storage chamber 16, and an upper filter chamber 17. A fluid inlet 14 is in communication with the lower fluid storage chamber 16, which is in communication with the upper filter chamber 17 through a passageway 15. A filter element 20 is housed within the upper filter chamber 17 of the housing 12 for filtering a fluid 19 to a fluid outlet 18. The fluid inlet 14 delivers fluid 19 into the housing 12 so that the fluid 19 may pass through the filter element 20 and out the fluid outlet 18. A relief valve 38 mounted in the top of the filter element 20 opens when the pressure level across the filter element 20 reaches a predetermined level. A relief valve filter 40 filters fluid 19 that passes through the relief valve 38. Preferably, the relief valve filter 40 is mounted below the relief valve 38, as shown in FIG. 4, but alternatively, the relief valve filter 40 may be mounted above the relief valve 38, as shown in FIG. 3.

To filter contaminants from the fluid 19, the filter element 20 is fabricated from a pleated porous paper material. The filter element 20 encircles a central filter tube 22 and is contained by a top and bottom end cap 24, 26, respectively, as seen in FIGS. 2 and 7-10. The top and bottom end caps 24, 26 are sealed to the edges of the filter element 20 to preclude any possible leak paths at the ends of the filter element 20. A flexible seal 28 is provided on the bottom end cap 26 of the filter element 20 to create a seal between the central filter tube 22 and an inner core 43 of the filter element 20 and ensure that unfiltered fluid 19 does not leak into or escape through the fluid outlet 18. The filter element 20 is preferably pleated or concentrically wound but may also be arranged in any of the ways known to one familiar with filtration construction so as to direct the fluid 19 through the filter element 20. In addition, the filter element 20 may be fabricated from a hydrophobic filter material to filter out water from the fluid 19.

The portion of the housing 12 between the filter element 20 and an outer wall 37 of the upper filter chamber 17 of the housing 12 is preferably divided by a substantially frusto-conical divider 30. The divider 30 has a top portion 32 that is either integrally or sealingly connected to the top end cap 24 of the filter element 20. The divider 30 also has a bottom portion 33 that extends downward toward the bottom of the filter element 20, while also tapering or flaring outward away from the filter element 20. It should be noted that the present invention is not limited to a frusto-conical divider 30, but rather, the divider 30 may also be substantially cylindrical wherein the bottom portion of the divider 30 may extend downward substantially parallel to the filter element 20. In both embodiments, the divider 30 essentially divides the upper filter chamber 17 of the housing 12 into an inner portion or region 34 and an outer portion or region 36. The inner portion 34 is the space contained between the outside or unfiltered side of the filter element 20 and the inner surface of the divider 30. The outer portion 36 is the space contained between the outer surface of the divider 30 and the inner surface of the outer wall 37 of the upper filter chamber 17 of the housing 12. The inner and outer portions 34, 36 remain in fluid communication at the bottom portion of the upper filter chamber 17 of the housing 12.

Figure 9:
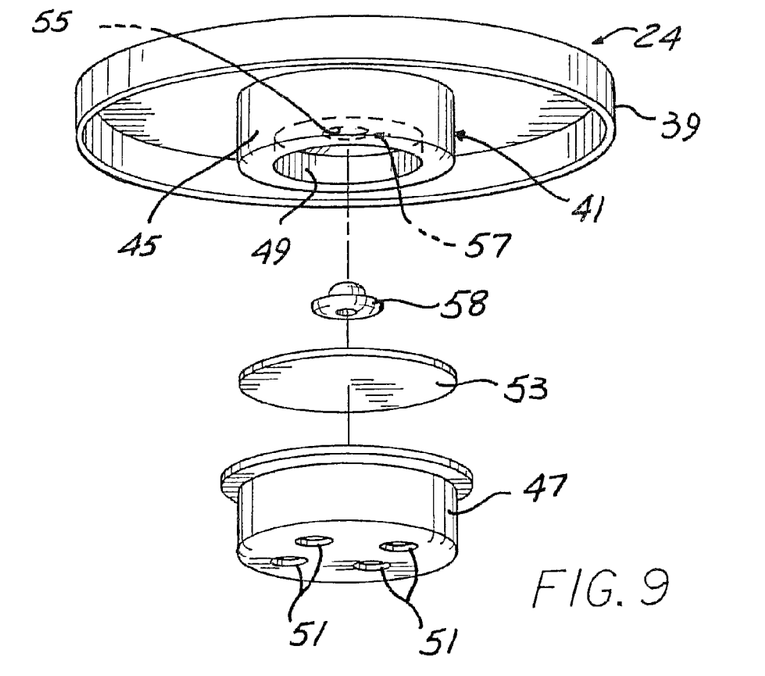
FIG. 9 is an exploded view of the relief valve shown in the top of the filter element in the fluid filter assembly of the present invention.
Figure 10:
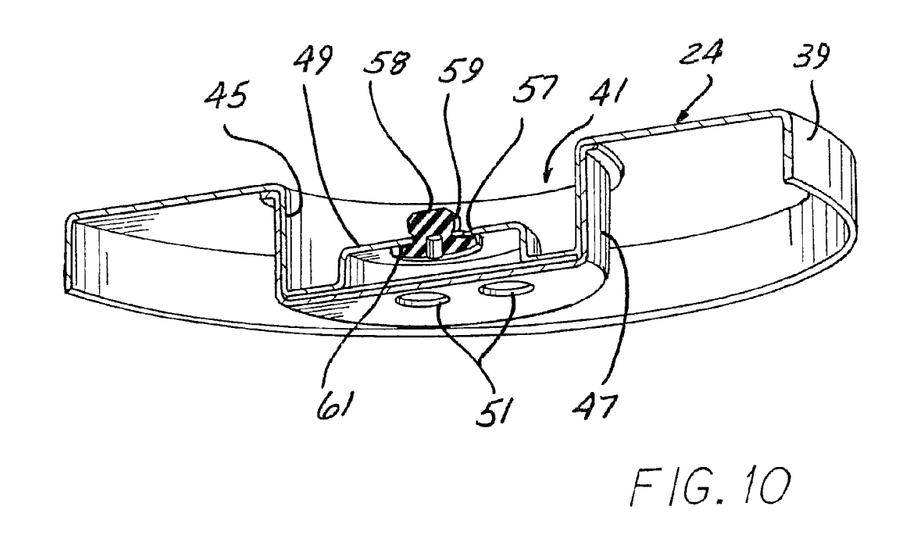
FIG. 10 is a sectioned perspective view of the relief valve shown in the top of the filter element in the fluid filter assembly of the present invention.

In order to maintain and relieve the pressure in the upper filter chamber 17 of the housing 12, a relief valve 38 is mounted in the top end cap 24 of the filter element 20. The top end cap 24 is fabricated from a thin metallic material having a shape complementary to the top of the filter element 20. The top end cap 24 has a substantially circular configuration with sidewalls 39 that extend downward from its periphery to sealingly connect to and cover the top of the filter element 20. The top end cap 24 also has a centrally located recessed portion 41 which is received by and complementarily engages the inner core 43 of the filter element 20.

The recessed portion 41 of the top end cap 24 is formed by two layers of thin metallic material. A first inner layer 45 is integrally connected to the sidewalls 39 and the portion of the top end cap 24 that extends over the top of the filter element 20. A second outer layer 47 of the recessed portion 41 is formed by a substantially cylindrical cup that is connected to and complementarily engages the inner layer 45 of the recessed portion 41. The inner layer 45 of the recessed portion 41 has a raised portion 49 relative to the outer layer 47. The outer layer 47 has four apertures 51 that extend therethrough and align directly under the raised portion 49 of the inner layer 45 of the recessed portion 41. A sheet of filter media 53 lies between the inner layer 45 and the outer layer 47 of the recessed portion 41 so as to cover the four apertures 51 extending through the outer layer 47.

The raised portion 49 of the inner layer 45 provides two apertures 55, 57 extending therethrough. The larger of the two apertures 55 receives a flexible valve member 58 having an inverted mushroom-shaped configuration. The stem portion 59 of the mushroom-shaped configuration is disposed within the larger aperture 55. The head portion 61 of the flexible member 58 extends across the underside of the raised portion 49 of the inner layer 45 such that the head portion 61 of the flexible member 58 covers the smaller aperture 57. The smaller aperture 57 acts as a port such that when the pressure level across the filter element 20 reaches a predetermined level, the head portion 61 of the flexible member 58 flexes away from the smaller aperture 57 thereby allowing fluid 19 and/or air/vapor from the unfiltered side of the filter element 20 to pass through the smaller aperture 57. Fluid 19 will only pass through the smaller aperture 57 after all of the air/vapor has first passed through the smaller aperture 57. The fluid 19 and/or air/vapor passes through the sheet of filter media 53 and through the four apertures 51 in the outer layer 47 of the recessed portion 41 to the filtered side of the filter element 20. Although the patentable subject matter may be limited to a relief valve 38 having the structure defined above, Applicants consider the invention to include any relief valve 38 having a structure that provides for the release of fluid 19 and/or air/vapor at a predetermined pressure level.

The relief valve 38 is normally closed until the pressure level across the filter element 20 exceeds a predetermined level. When the relief valve 38 is closed, the air/vapor within the outer portion 36 of the housing 12 is trapped thereby forcing the fluid level in the outer portion 36 to be lower than the fluid level in the inner portion 34. This occurs because as long as the filter element 20 is not clogged, air/vapor and fluid 19 within the inner portion 34 will pass through the filter element 20 at a pressure less than the pressure level in which the relief valve 38 is to open. Once the pressure across the filter element 20 exceeds the predetermined level due to the filter element being sufficiently clogged, the relief valve 38 opens and allows air/vapor and/or fluid 19 to pass from the outer portion 36 of the housing 12 to the inner core 43 of the filter element 20.

Figure 6:
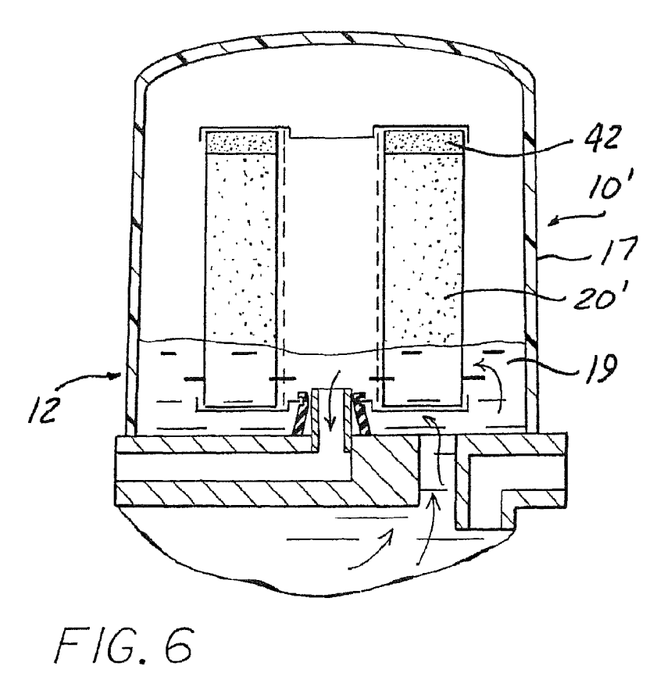
FIG. 6 is a schematic drawing showing a restrictive media being utilized as a relief valve in the fluid filter assembly of the present invention.
Figure 7:
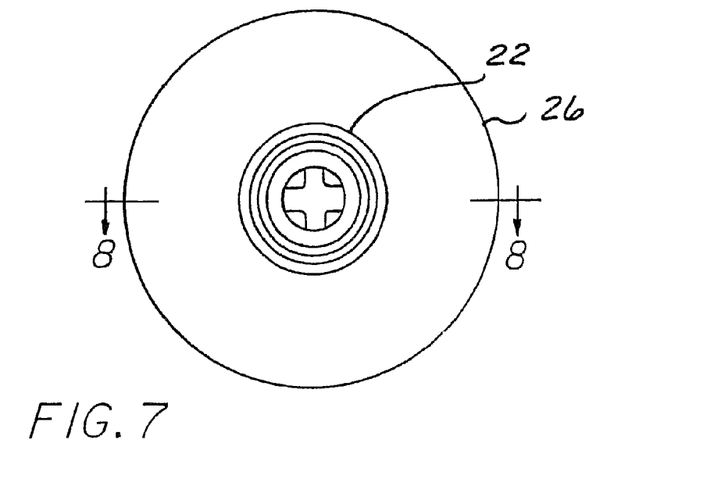
FIG. 7 is a bottom view of the filter element in the fluid filter assembly of the present invention.
Figure 8:
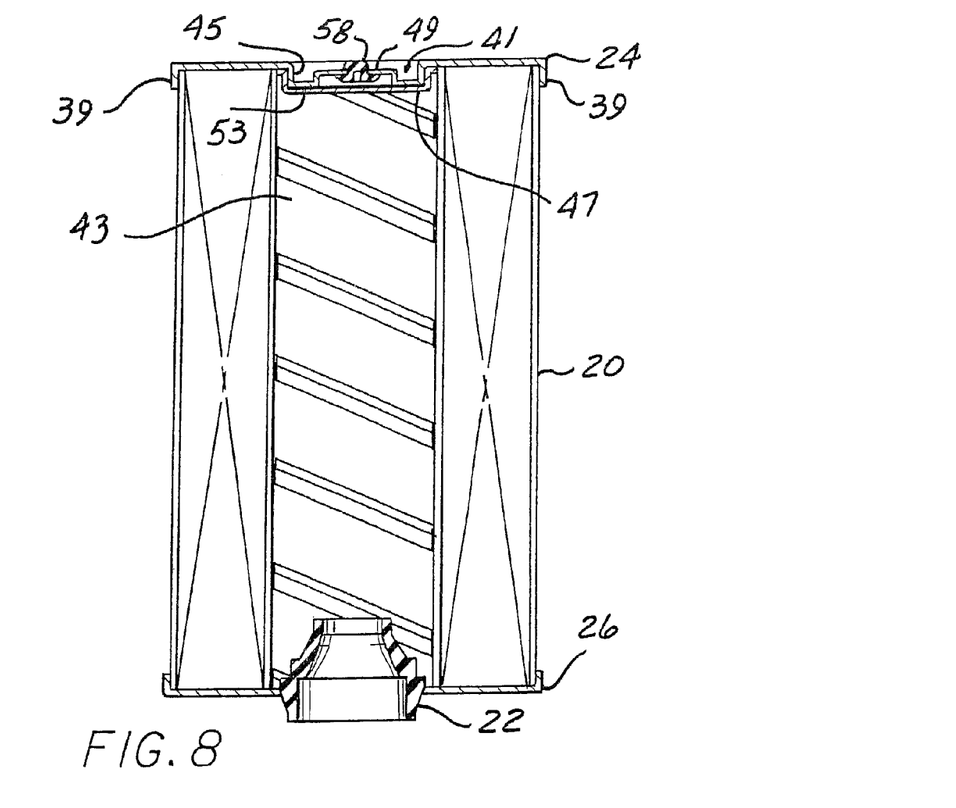
FIG. 8 is a sectional view of the filter element in the fluid filter assembly of the present invention taken in the direction of arrows 9-9 in FIG. 8.

In a secondary embodiment of the fluid filter assembly 10', a restrictive filter media section 42 of the filter media 20' is either integrally formed on the top of the filter media 20' or is attached to the upper portion of the filter media 20', as shown in FIG. 6. The restrictive section 42 of the filter media 20' acts in the same manner as the relief valve 38 and the relief valve filter 40 of the preferred embodiment, but the secondary embodiment does not require the divider 30. The restrictive section 42 of the filter media 20' only allows air/vapor and/or fluid 19 to pass through the restrictive section 42 once the pressure level across the filter element 20 exceeds a predetermined level. This ensures that the fluid level within the housing 12 will remain at a level below the restrictive filter media 42. Once the predetermined pressure level is reached, air/vapor and/or fluid is allowed to pass through the restrictive filter media 42 thereby raising the fluid level and providing a visual indicator that the filter media 20' needs replacement.

Figure 5:
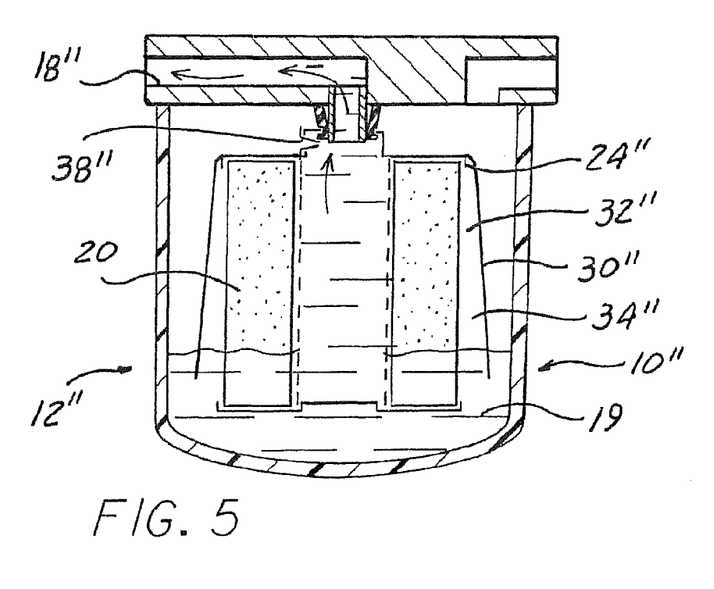
FIG. 5 is a schematic drawing of a hang down fluid filter assembly of the present invention.

In yet another embodiment of the present invention, a divider 30" and a relief valve 38" may be utilized in conjunction with a hang down fluid filter assembly 10", as shown in FIG. 5. The structure in this embodiment is similar to that of the preferred embodiment in that the divider 30" is sealingly connected to a top end cap 24". The divider 30" extends downward along the bottom portion of the filter element 20 while flaring outward from the filter element 20. A relief valve filter (although not shown in FIG. 5 but similar to that shown in FIGS. 3-4) is mounted in a portion of the central filter tube 22. The relief valve filter is incorporated with the relief valve 38" to prevent any unfiltered fluid 19 from entering fluid outlet 18". The relief valve 38" in the hang down fluid filter assembly 10" works in the same manner as the preferred embodiment. The divider 30" forms an outer portion 34" and an inner portion 32" of the housing 12" wherein the trapped air in the outer portion 34" forces the fluid level in the outer portion 34" to be lower than the fluid level in the inner portion 32". This allows the filter element 20 to become completely clogged before reaching the predetermined pressure level that will open the relief valve 38". Once the relief valve 38" opens, air/vapor passes through the relief valve 38" thereby allowing the fluid level in the outer portion 34" to rise and provide a visual indicator that the filter element 20 needs replacement.

Figure 1:
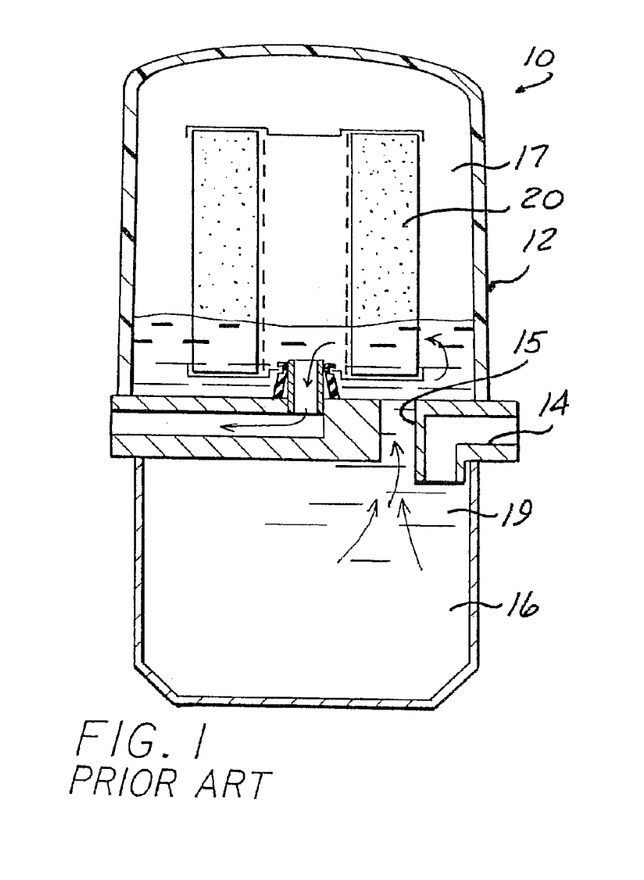
FIG. 1 is a schematic drawing showing the fluid flow path and the normal rising fluid path of a prior art fuel filter assembly.

In operation, the prior art device functions as depicted in FIG. 1. Fluid 19 enters the fluid inlet 14 of the fluid filter assembly 10 and accumulates within the lower fluid storage chamber 16 of the housing 12. Fluid 19 flows through the passageway 15 leading to the upper filter chamber 17 wherein an unfiltered fluid level is established within the upper filter chamber 17. The fluid 19 is drawn into the upper filter chamber 17 by vacuum (as most commonly occurs in diesel fuel filters) or forced by low pressure (as seen in oil, antifreeze or many other filters) until it finds a path through the filter element 20. As the filter element 20 becomes partially clogged, the restriction increases temporarily overcoming the surface tension of fluid covering the unused pores of the filter element 20 and causing a temporary flow of air/vapor through the filter element 20. As the air/vapor passes, it creates a void on the outside of the filter element 20, and the fluid level rises to fill the void. The new fluid level allows flow through clean and unused pores of the filter element 20, and the restriction through the filter element 20 reestablishes itself at a fluid level as previously described. Once the fluid level establishes itself, the surface tension of the fluid 19 across the remaining pores of the filter element 20 prevents the flow of air/vapor through the filter element 20 until, once again, the restriction increases to a level in which air/vapor is forced through the filter element 20. This process continues as dirt and other contaminants in the fluid 19, larger than the openings in the filter element 20, are trapped and retained by the filter element 20 as the fluid 19 passes through the filter element 20. These contaminants plug or clog the holes in the filter element 20 and restrict and/or close the paths used by the flowing fluid 19. The fluid 19 is forced to seek other open and less restrictive fluid openings that are above the level of the fluid 19, and therefore, the fluid 19 climbs up the height of the filter element 20 and uses the clean areas of the filter element 20. The process of clogging and climbing continues until the filter element 20 is completely immersed in the flowing fluid 19. When the fluid level reaches the top of the upper filter chamber 17, this has generally been a visible indication to the user to change the filter element 20. The problem with changing the filter element 20 at this point is that the filter element 20 still allows for the passage of fluid 19 through the filter element 20 even when the fluid level has risen to the top of the upper filter chamber 17. Therefore, if the filter element 20 is changed immediately upon the fluid level rising to the top of the upper filter chamber 17, then the filter element 20 is being replaced prematurely.

During the operation of the preferred embodiment of the present invention, fluid 19 enters the fluid filter assembly 10 and the upper filter chamber 17 in the same way as described in the prior art. However, by employing the divider 30 and incorporating the preset relief valve 38 in the top end cap 24, the fluid level can be made to rise approximately in proportion to the plugging rate of the fuel element 20. This gives an accurate visual indicator as to the remaining life of the filter element 20. In so doing, the incoming fluid 19 and air/vapor initially behave as similarly described in the prior art. When the fluid level approaches the bottom of the divider 30, the fluid 19 continues to rise between the filter element 20 and the inside surface of the divider 30, which was previously defined as the inner portion 34 of the housing 12, but the fluid 19 does not rise between the outer surface of the divider 30 and the outer wall 37 of the housing 12, which was previously defined as the outer portion 36 of the housing 12. This is because the trapped air/vapor in the outer portion 36 of the housing 12 prevents the rise of fluid 19 into the outer portion 36 of the housing 12.

As to the inner portion 34 of the housing 12, fluid 19 and air/vapor move through the filter element 20 in a usual manner. The fluid level continues to rise between the filter element 20 and the inside surface of the divider 30 as the filter element 20 becomes more clogged. This continues until the fluid 19 has risen to the full or nearly full height of the filter element 20, as previously described. Once the filter element 20 is completely saturated, the pressure differential across the filter element 20 begins to increase with the increased clogging of the filter element 20. Once this pressure differential reaches a predetermined level, preferably 5" Hg, the relief valve 38 may open, and vapor/air may flow through the relief valve 38 while fluid 19 flows through the filter element 20 since both present the same amount of resistance to flow. As the pressure differential across the filter element 20 begins to exceed the 5" Hg point, the relief valve 38 becomes the preferred flow path since its pressure differential is fixed at 5" Hg. Since air/vapor is closest to the relief valve 38, the air/vapor flows through the relief valve 38 first, and the fluid 19 follows. The fluid level begins to rise in the outer portion 36 of the housing 12, thereby providing a visual indicator to the operator that the filter element 20 is plugged. The relief valve filter 40 provided in the fluid path of the relief valve 38 ensures that the fluid 19 that passes through the relief valve 38 is filtered. Once the user sees that the fluid level in the outer portion 36 of the housing 12 has risen to the top of the upper filter chamber 17, the user knows to replace the filter element 20.

In operation, the secondary embodiment, as depicted in FIG. 4, works in a similar manner as described in the preferred embodiment. The fluid level rises within the upper filter chamber 17, until it reaches the restrictive filter media 42 on the filter media 20'. When the fluid level reaches the restrictive media 42, the pressure differential across the filter media 20' must rise to a preferred level of 5" Hg in order for the air/vapor and fluid 19 to pass through the restrictive media 42. The fluid level stops at a point just below the restrictive media 42 until the filter media 20' becomes so clogged that the pressure differential reaches the 5" Hg level. At that point, air/vapor and fluid 19 pass through the restrictive media 42, thus allowing the fluid level to rise within the upper filter chamber 17 of the fluid filter assembly 10'. The user may then use the risen fluid level as an indicator that the filter media 20' needs to be replaced.

In operation, the alternative embodiment depicted in FIG. 5 works in exactly the same manner as described in the preferred embodiment. The only difference in the embodiment depicted in FIG. 5 is that the housing 12" is upside down, but the fluid level responds in the same manner as described in the preferred embodiment.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, the scope is to be accorded the broadest interpretation so as to encompass all such modifications and equivalent structures as is permitted under the law.

What is claimed is:

1. A replaceable filter cartridge for filtering liquids, comprising:
   a filter media adapted to allow liquids to pass from an exterior of said filter media to an interior of said filter media, and said filter media having a first end and a second end, wherein said filter media has a corrugated structure formed by a continuous sheet of filter media;
   said second end of said filter media having a bottom cap sealingly connected to said filter media and having an opening extending therethrough and adaptable to receive a fluid outlet for allowing liquid to pass through said second end; and
   a divider positioned adjacent to said exterior of said filter media, and said divider having a closed end connected to said first end of said filter media and an open end that is longitudinally-spaced from said second end of said filter media such that at least a portion of said filter media located adjacent to said second end of said filter media is not directly adjacent to said divider, and said divider extending a majority of the distance from said first end to said second end of said filter media for allowing the liquids to rise in between the divider and the filter media, and said divider longitudinally extending only between said filter media ends.

2. The replaceable filter cartridge of claim 1, further comprising:
   said divider being substantially parallel to said exterior of said filter media.

3. The replaceable filter cartridge of claim 1, further comprising:
   said divider being non parallel to said exterior of said filter media.

4. The replaceable filter cartridge as stated in claim 3, further comprising:
   said divider having a longitudinal axis and extending radially outward from said closed end of said divider to said open end of said divider.

5. The replaceable filter cartridge stated in claim 1, further comprising:
   a filter tube connected to said interior of said filter media.

6. The replaceable filter cartridge stated in claim 1, further comprising:
   said filter media having a substantially cylindrical configuration; and
   said interior of said filter media defined by an inner diameter of said substantially cylindrical filter media to form a column of open space that is coaxial with a longitudinal axis of said substantially cylindrical filter media for receiving filtered fluid that has passed through said filter media.

7. The replaceable filter cartridge stated in claim 1, further comprising:
   said opening in said second end of said filter media being substantially circular and coaxial with a longitudinal axis of said filter media.

8. The replaceable filter cartridge of claim 1, wherein the divider is sealingly connected to the top end cap.

9. The replaceable filter cartridge of claim 1, wherein the divider is integrally connected to the top end cap.

10. A replaceable filter cartridge for filtering liquids, comprising:
    a substantially cylindrical filter media adaptable to allow liquids to pass from an exterior of said filter media to an interior of said filter media, and said filter media having an upper end and a lower end, wherein said filter media has a corrugated structure formed by a continuous sheet of filter media;
    a top cap disposed at and sealingly connected to said upper end of said filter media;
    a bottom cap disposed at and sealingly connected to said lower end of said filter media and having an opening extending therethrough and adaptable to receive a fluid outlet for allowing liquid to pass through said second end; and
    a divider positioned adjacent to said exterior of said filter media, and said divider having an upper end sealingly connected to said top cap and an open lower end, and said divider extending a majority of the distance from said top cap to said bottom cap for allowing the liquids to rise in between the divider and the filter media independent of a level of the liquids outside the divider, wherein said open lower end of said divider is longitudinally spaced from said bottom cap such that at least a portion of said filter media located adjacent to said bottom cap is not directly adjacent to said divider, and said divider longitudinally extending only between said filter media ends.

11. The replaceable filter cartridge stated in claim 10, further comprising:
said divider defining an interior region between the outside of said filter media and an inner surface of said divider and an exterior region adjacent to the outer surface of said divider, wherein said interior region and said exterior region are in communication at said lower end of said divider.

12. The replaceable filter cartridge stated in claim 10, further comprising:
said divider having a substantially cylindrical configuration, wherein said divider is substantially parallel to said filter media.

13. The replaceable filter cartridge stated in claim 10, further comprising:
said divider having a frusto-conical configuration.

14. The replaceable filter cartridge stated in claim 10, further comprising:
a substantially cylindrical filter tube connected to an inner diameter of said substantially cylindrical filter media.

15. The replaceable filter cartridge stated in claim 10, further comprising:
said interior of said filter media defined by an inner diameter of said substantially cylindrical filter media to form a column of open space that is coaxial with a longitudinal axis of said substantially cylindrical filter media for receiving filtered fluid that passes through from said exterior of said filter media to said interior of said filter media.

16. The replaceable filter cartridge stated in claim 15, further comprising:
said opening in said bottom cap being substantially circular and coaxial with said longitudinal axis of said filter media.

17. A replaceable filter cartridge for filtering liquids, comprising:
a substantially cylindrical filter media adaptable to allow liquids to pass from an exterior of said filter media to a substantially cylindrical, substantially unobstructed interior space partially defined by said filter media, wherein said filter media has a corrugated structure formed by a continuous sheet of filter media;
a top cap disposed at said upper end of said interior space and sealingly connected to said filter media;
a bottom cap sealingly connected to said filter media and disposed at said lower end of said interior space and having an opening extending therethrough and adaptable to receive a fluid outlet to allow liquid to pass through said second end; and
a divider positioned adjacent to said exterior of said filter media, and said divider having an upper end sealingly connected to said top cap and an open lower end, and said divider defining an interior region between the outside of said filter media and an inner surface of said divider and an exterior region adjacent to the outer surface of said divider, and said divider extending a majority of the distance from said top cap to said bottom cap for allowing the liquids to rise in between the divider and the filter media independent of a level of the liquids outside the divider, wherein said open lower end of said divider is longitudinally spaced from said bottom cap such that at least a portion of said filter media located adjacent to said bottom cap is not directly adjacent to said divider, and said interior region and said exterior region are in communication at said open lower end of said divider, and said divider longitudinally extending only between said filter media ends.

18. The replaceable filter cartridge stated in claim 17, further comprising:
said divider having a substantially cylindrical configuration wherein said divider is substantially parallel to said filter media.

19. The replaceable filter cartridge stated in claim 17, further comprising:
said divider having a frusto-conical configuration.

20. The replaceable filter cartridge stated in claim 17, further comprising:
a substantially cylindrical filter tube connected to an inner diameter of said substantially cylindrical filter media.

* * * * *